Jan. 12, 1932.  S. TRANIN  1,840,987
METHOD OF AND APPARATUS FOR MIXING LIQUIDS
Filed Sept. 18, 1929

INVENTOR
Samuel Tranin
BY Arthur C. Brown
ATTORNEY

Patented Jan. 12, 1932

1,840,987

UNITED STATES PATENT OFFICE

SAMUEL TRANIN, OF KANSAS CITY, MISSOURI, ASSIGNOR TO TRANIN EGG PRODUCTS CO., A CORPORATION OF MISSOURI

METHOD OF AND APPARATUS FOR MIXING LIQUIDS

Application filed September 18, 1929. Serial No. 393,448.

My invention relates to mixers and methods of mixing, and has for its principal object to effect thorough mixing of a fluid material without entraining air.

The invention is particularly applicable to the packaging of food products such as liquid eggs. Yolks and whites of eggs separated from the shells, and yolks and whites together, are prepared for packaging by churning to produce a homogeneous liquid having uniform color and texture. The treatment ordinarily consists in breaking eggs into a tank, agitating the mass of liquid eggs by means of paddles or the like, and draining the treated mass from the tank. The treatment produces a foam which remains with the liquid egg product and substantially reduces the quality and value of the same.

Particular objects of my invention therefore are to avoid formation of foam during the process of mixing liquid eggs, and to isolate liquid egg products from air while mixing is being effected.

In accomplishing these and other objects of the invention, I have provided improved details of structure, the preferred forms of which are illustrated in the accompanying drawings, wherein.

Figure 1:
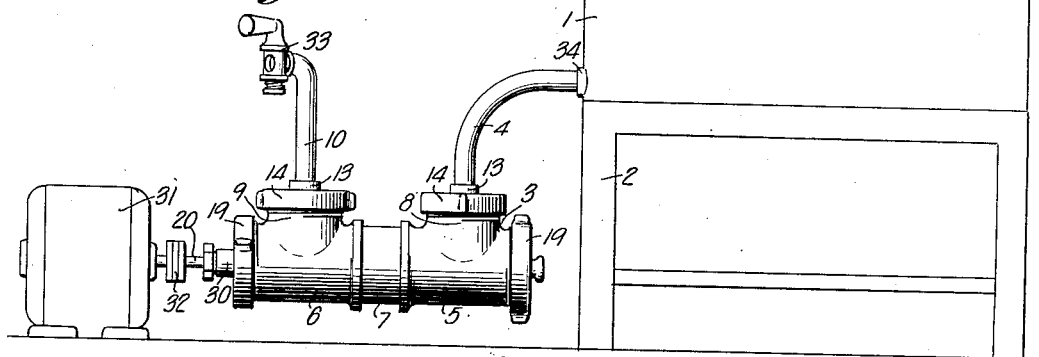
Fig. 1 is a side elevation of mixing apparatus embodying my invention including the lower portion of a supply tank.
Figure 2:
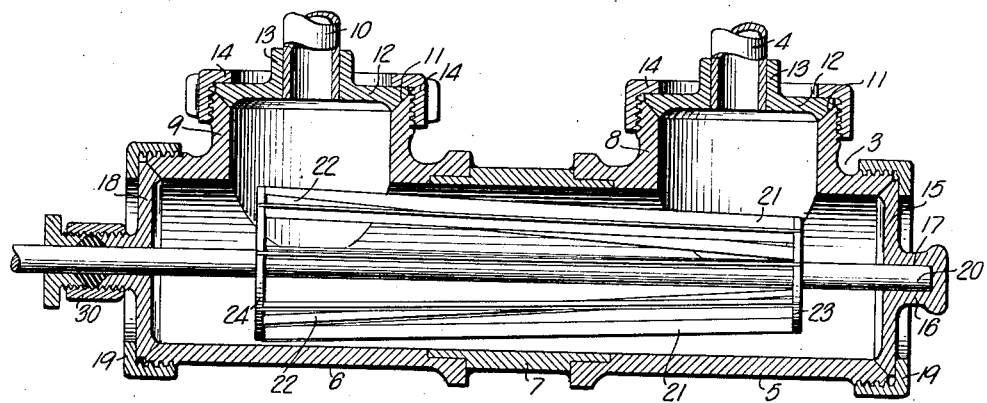
Fig. 2 is an enlarged longitudinal vertical section of the mixing casing and agitator.
Figure 3:
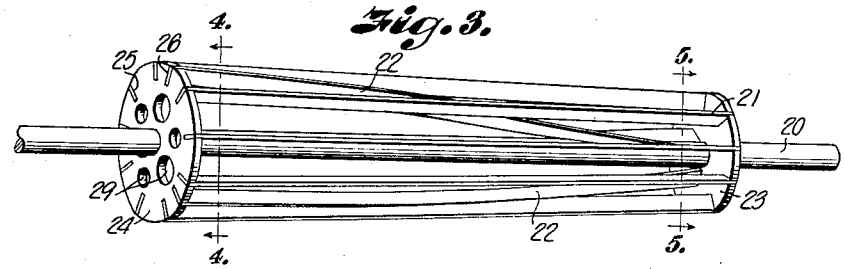
Fig. 3 is a detail perspective view of a propeller.
Figure 4:
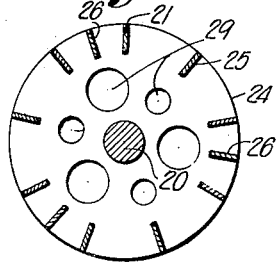
Fig. 4 is a section on the line 4—4, Fig. 3.

Referring in detail to the drawings:

1 designates a supply tank supported in an elevated position by a table 2, and 3 designates a casing located below the bottom of the tank and connected therewith by a conduit 4 for gravity flow of liquid from the tank to the casing.

The casing comprises T-like inlet and outlet members 5 and 6 having bodies aligned and connected by a tubular coupling 7 to form a horizontally elongated chamber, and vertically extending tubular branches 8 and 9 connected respectively with the conduit 4 and with an outlet conduit 10.

The branches 8 and 9 are aligned on the top of the casing, and have beveled seats 11 to receive the beveled peripheries of caps 12 having axial tubular bosses 13 in which the conduits are fixed. The caps are sealingly retained in the seats by rings 14 having skirt-like flanges screwthreadedly engaging the branches.

The horizontal outer ends of the casing members have similar beveled seats to receive respectively the beveled edges of a cap 15 having an axial external boss 16 and provided with an internal socket 17 extending in the boss, and an apertured bearing cap 18, the caps 15 and 18 being retained by flanged wings 19 screwthreaded on the members.

A rotatable shaft 20 extending through the journal opening of the cap 18 into and through the chamber has its inner end supported in the bearing socket 17, to provide trunnion-like portions for supporting an agitating and propelling assembly including agitating blades or paddles 21 extending in planes intersecting the planes of the axis of the shaft and propelling blades 22 extending angularly to the axis of the shaft.

The blades are mounted in edgewise position on a plurality of radial members such as disks, preferably a pair of disks 23 and 24 fixed to the shaft in spaced relation and located in spaced relation with the ends of the chamber to position the ends of the assembly inwardly from the outer end points on the circumference of the inlet and outlet openings of the branches.

The disk 23 at the inlet end of the chamber is smaller than the disk 24 adjacent the outlet, and the paddles 21 have opposite ends mounted in peripheral radial notches 25 of the disks with outer edges flush with the peripheries of the disks, whereby a tapering or conical assembly is formed having increasing diameter from the inlet toward the outlet of the chamber.

The paddles are relatively thin strips of suitable material, for example metal, having appreciable width substantially less than the radii of the disks, and preferably have equal width through their lengths. A plurality of paddles are arranged symmetrically on the spaced disks, nine paddles being shown in the illustrated application of the invention.

Figure 5:
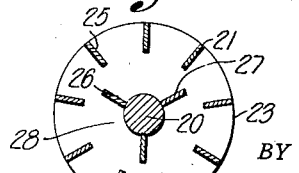
Fig. 5 is a section on the line 5—5, Fig. 3.

The propelling blades 22 also comprise relatively thin and narrow strips and have outer ends mounted in peripheral notches 26 in the larger disk 24 similarly to the paddles. The inner ends of the propelling blades however, are fixed in slots 27 extending radially from the axial opening in the inlet end disk 23 and engage the shaft, thus forming an annual series of pockets 28 spaced inwardly from the inner edges of the paddles as clearly shown in Fig. 5.

The blades 22 are thus spirally related to the shaft, and due to the radial character of the notches 26 and slots 27, the blades are curved slightly whereby their propelling action is enhanced.

The blades 22 comprise a screw-like propeller, and since liquid may move longitudinally in the assembly the paddles and the shaft, the larger disk 24 is provided with an annular series of ports 29 for facilitating movement of liquid outwardly from the assembly.

The shaft extends outwardly from the chamber through a packing gland 30 mounted on the bearing cap 18, and is connected with a motor 31 by a flexible coupling 32 whereby the propelling and agitating assembly is rotatable.

The outlet conduit 10 leads to a valved coupling 33 for controlled delivery of mixed liquid to suitable containers for packaging.

The inlet conduit is connected to an outlet opening 34 in the side wall of the supply tank adjacent the bottom thereof.

The pump casing is located below the tank outlet for gravity flow of material from the tank thereto. The outlet conduit may extend in any desired direction or to any distance from the outlet end of the chamber, but preferably to a point slightly above the tank outlet.

The chamber in the casing may have any desired contour, and is illustrated as cylindrical, whereby the outlet end of the mixing assembly is spaced slightly less from the wall of the chamber than the inlet end thereof, and moves close to the lower segment of the wall to promote the discharge of material and avoid formation of a quiet zone dimetrically opposite the outlet.

The extent to which the outer edges of the paddles engage the inner surfaces of the casing may be varied according to the extent of agitation desired, and the disks may be spaced from the end walls of the casing suitably for effecting more or less agitation. In the pump illustrated, the outlet end portions of the paddles move close to the inner surface of the casing, while the paddles are spaced slightly from the surface due to the tapering character of the propeller and the cylindrical character of the casing. The disks are spaced from the end walls of the casing since liquid may pass around the first disk from the inlet end and may pass through the second disk toward the space at the outlet end of the casing.

Use of the invention will first be described as applied to conditioning egg whites for packaging. Egg whites are selected because it has heretofore been impracticable to agitate whites as a preliminary step for packaging because of their extreme susceptibility to beating in the presence of air, foam being formed therein under the slightest disturbance.

It has been recognized, however, that some kind of treatment should be given to egg whites before packaging, especially if the whites are to be frozen.

Egg whites consist of thin and thick portions consisting of two types of particles known as flakes which tend to separate when the white stand for any appreciable period, or are frozen, the thick part becoming tough flakes that aggregate and stick together to form masses, and the other flakes comprising a relatively thin liquid. When the user opens the package he must thoroughly mix the product to break up the aggregations of thick flakes and produce a relatively homogeneous body of liquid before the actual beating step can take place. When the flakes have once separated it is practically impossible to effect complete mixing and even distribution of flakes through the mass. Even when relatively extensive preliminary mixing is conferred by the baker it is still difficult to beat up the whites to form the desired foamy mass, and the quality of the resulting beaten whites is unsatisfactory, because the relatively thin liquid constituent beats up more readily and must be beaten excessively in order to dissolve the tough flakes and confer the desired quality on that portion of the whites.

In using my apparatus the separated whites of eggs are introduced to the tank in sufficient amount to cover the outlet opening and drain into the air tight pocket or casing. When the agitator casing is filled, and further whites are supplied to the tank, the agitator may be put into operation to cut the whites while the same move in a continuous stream from the tank to a container out of contact with air.

The level of liquid in the tank is always kept above the tank outlet so that air will not be drawn into the casing while the liquid is flowing therethrough to the container.

The agitator in the casing is preferably rotated rapidly, for example at 3200 revolutions per minute, the curved blades moving the whites in a stream continuously and effecting mixing of the same, while the straight paddles promote the intermingling of particles of the stream. The blades and paddles act as knives to cut the particles of whites while the same are contained in the air tight pocket, and fill the same to the exclusion of air, the cutting being effected without injury to the whites or deleteriously affecting their condition.

The extent to which the whites are beaten and agitated during their passage through the casing may be varied by adjusting the number and relations of the blades to the inner surface of the container and to the inlet and outlet openings.

The whites transferred and treated by the apparatus described issue from the discharge outlet as a clear liquid substantially devoid of air bubbles and with the two types of flakes thoroughly intermingled in an emulsion-like mixture.

A package of egg whites thus treated may be frozen and kept a considerable period, neither the standing nor the freezing having any deleterious effect on the character of the liquid. When the package is opened and thawed the whites may be immediately beaten up to form a constituent of a bakery product.

Whereas preliminary mixing of four or five minutes and beating for twelve to fourteen minutes is required for whites packaged as in ordinary practice, five minutes will suffice for beating up whites treated by my apparatus and method and the resulting mass will have substantially higher quality for use in baking than whites not so treated however long the untreated whites may be beaten.

While egg whites have been mentioned as an example of liquids that may be treated by my apparatus, egg yolks, mixed whites and yolks, dried milk and water, and similar food materials are similarly benefited by being passed through my apparatus from a tank to a package through an airtight mixer.

My method of treating liquid products greatly reduces the time and labor involved in conditioning a liquid for packaging, since a stream of liquid moves steadily through a pump and is mixed while moving from the tank toward the container, whereas in ordinary practice the supply tank must be filled before its contents are agitated and agitation of the entire mass in the tank must be completed before any part is discharged.

The use of my apparatus substantially eliminates hazard of contamination of a liquid by bacteria floating in the air, since agitation occurs in an air tight casing, as contrasted with the usual mixing process in which a liquid is in contact with air while being mixed and air is thus drawn violently in the body of liquid and discharged therethrough.

Hazard of contamination of a food product is further reduced because of the marked reduction in the time required for applying ordinary beating treatment to products packaged by my process. The case of egg whites represents the most radical reduction in final mixing time. Dry milk and water, are so effectually mixed by the apparatus described, that relatively little separation occurs even after the product stands a considerable length of time.

What I claim and desired to secure by Letters Patent is:

1. In apparatus of the character described, a casing having vertically directed inlet and outlet ports in its top portion adjacent opposite ends thereof, a shaft extending through the casing, a pair of disks having different diameters fixed to said shaft in spaced relation with the ends of the casing to locate the smaller and larger of said disks respectively adjacent said inlet and outlet ports, and blades fixed to said disks extending longitudinally in the casing.

2. In apparatus of the character described, a casing having inlet and outlet ports, a rotatable shaft in the casing, a pair of disks having different diameters fixed to the shaft, cutting means including a blade having opposite ends fixed in the peripheries of said disks, and a curved blade having one end fixed in the periphery of the larger disk and an opposite end fixed in the smaller disk adjacent the axis thereof for propelling material through the casing.

3. In apparatus of the character described, a casing having an elongated horizontal chamber and vertically upwardly directed inlet and outlet ports spaced from the ends of said chamber, a shaft extending through said chamber on the axis thereof, a pair of radial supports having different radial lengths fixed to the shaft, the shorter and longer of said supports being located respectively adjacent said inlet and outlet ports, and blades having opposite ends fixed in said supports and terminating therein.

4. The method of mixing eggs including isolating a mass of broken eggs from contact with air, and mixing the thick and thin components of the eggs while isolated from air.

5. In apparatus for mixing liquids including a casing having inlet and outlet ports, and a rotatable shaft in the casing, an imperforate disk fixed to the shaft adjacent the inlet port, a perforate disk fixed to the shaft adjacent the outlet port, and means supported by the shaft for moving liquid through the casing.

6. Apparatus for mixing liquids including a casing having a horizontally elongated cylindrical chamber, vertically extending pipes having lower ends connected to the top of the chamber adjacent the ends thereof to form inlet and outlet ports, a rotatable shaft extending through the chamber on the axis thereof, a disk having substantially less diameter than the chamber mounted on the shaft adjacent the inlet port, a disk having approximately the same diameter as the chamber mounted on the shaft adjacent the outlet port, and a blade having opposite ends fixed to said disks.

7. In apparatus of the character described including a casing having inlet and outlet ports adjacent inner and outer ends of the casing, a rotatable support in the casing including trunnions in opposite end walls thereof, radial members on the trunnions spaced substantial distances from said walls, and including a member adjacent the inlet port and a perforate member adjacent the outlet port, and a plurality of blades mounted on the support and having outer ends fixed to said perforate member and inner ends terminating in substantially spaced relation with the inner end wall of the casing.

8. In apparatus of the character described including a casing having a cylindrical chamber and inlet and outlet ports adjacent inner and outer end walls of the chamber, a rotatable blade assembly in the chamber including a shaft having a portion mounted in said outer end wall and a perforate member extending radially at right angles from the shaft in substantially spaced relation with the outer end wall of the chamber and opposite the outlet port, and a plurality of blades having outer ends fixed in the perforate member at the periphery thereof and inner ends connected with the shaft at points opposite the inlet ports.

In testimony whereof I affix my signature.

SAMUEL TRANIN.